United States Patent [19]

Noda et al.

[11] Patent Number: 4,537,287
[45] Date of Patent: Aug. 27, 1985

[54] APPARATUS FOR DETECTING ABNORMALITY IN THE CAGE OF AN ELEVATOR

[75] Inventors: Masahiro Noda, Ichinomiya; Hiroshi Ando, Inazawa, both of Japan

[73] Assignee: Mitsubishi Denki Kabushiki Kaisha, Japan

[21] Appl. No.: 618,739

[22] Filed: Jun. 8, 1984

[30] Foreign Application Priority Data

Jun. 17, 1983 [JP] Japan .................................. 58-92815

[51] Int. Cl.³ .............................................. B66B 13/24
[52] U.S. Cl. ...................................... 187/29 R; 367/96
[58] Field of Search ...................... 187/29; 367/93–96

[56] References Cited

U.S. PATENT DOCUMENTS

| | | | |
|---|---|---|---|
| 3,594,768 | 7/1971 | Harris et al. | 367/94 X |
| 3,793,617 | 2/1974 | Tolman | 367/94 X |
| 4,003,045 | 1/1977 | Stockdale | 367/94 |
| 4,029,176 | 6/1977 | Mills | 367/96 X |
| 4,460,066 | 7/1984 | Ohta | 187/29 R |
| 4,482,032 | 11/1984 | Enriquez et al. | 187/29 R |

Primary Examiner—Stanley J. Witkowski
Assistant Examiner—W. E. Duncanson, Jr.
Attorney, Agent, or Firm—Leydig, Voit, Osann, Mayer and Holt, Ltd.

[57] ABSTRACT

The present invention relates to an apparatus for detecting any abnormality in a cage of an elevator, characterized by comprising a transmitter which continuously transmits an ultrasonic wave inwardly of the cage of the elevator, a receiver which receives an ultrasonic wave retrogressing in such a manner that the ultrasonic wave transmitted from said transmitter is reflected by an object within the cage, and a processing circuit which detects the rate of movement of the object within the cage on the basis of a magnitude difference between frequencies of the ultrasonic waves of said transmitter and said receiver and which decides that an abnormality has occurred in the cage when the difference frequency has become at least a preset value.

10 Claims, 11 Drawing Figures

APPARATUS FOR DETECTING ABNORMALITY IN THE CAGE OF AN ELEVATOR

BACKGROUND OF THE INVENTION

This invention relates to the detection of abnormal action by a man or an object in the cage of an elevator.

Since the cage of an elevator becomes a closed room, crimes in the cage occur frequently. In order to prevent these abnormal actions, the function of operating the elevator so as to stop the cage at each floor in response to a cage call is sometimes added in a specified time zone. This measure, however, is not satisfactory for the prevention of these actions.

Meanwhile, there has not been introduced any device which prevents a governor from being tripped due to vibrations attributed to jumping or violent behaviour by a man in the cage during the running therof, and the elevator has been quite defenseless as to abnormal actions of a man in the cage.

SUMMARY OF THE INVENTION

This invention has been made in order to eliminate the disadvantages of the prior art described above, and has for its object to provide an apparatus for detecting any abnormality in the cage of an elevator in which the movement of a man or an object within the cage is monitored by an ultrasonic wave so as to prevent a crime or the abnormal operation of the elevator from occuring.

In the apparatus according to this invention, an ultrasonic oscillator and a receiver are mounted inwardly of the cage of the elevator, and the movement of a man or object within the cage is detected on the basis of a difference between the frequencies of the transmitter and the receiver. Thus, any action or operation dangerous to the elevator can be detected beforehand, and the apparatus is very effective in the prevention of crimes.

DESCRIPTION OF THE PREFERRED EMBODIMENTS

Now, one embodiment of this invention will be described with reference to FIGS. 1 and 2.

Figure 1:
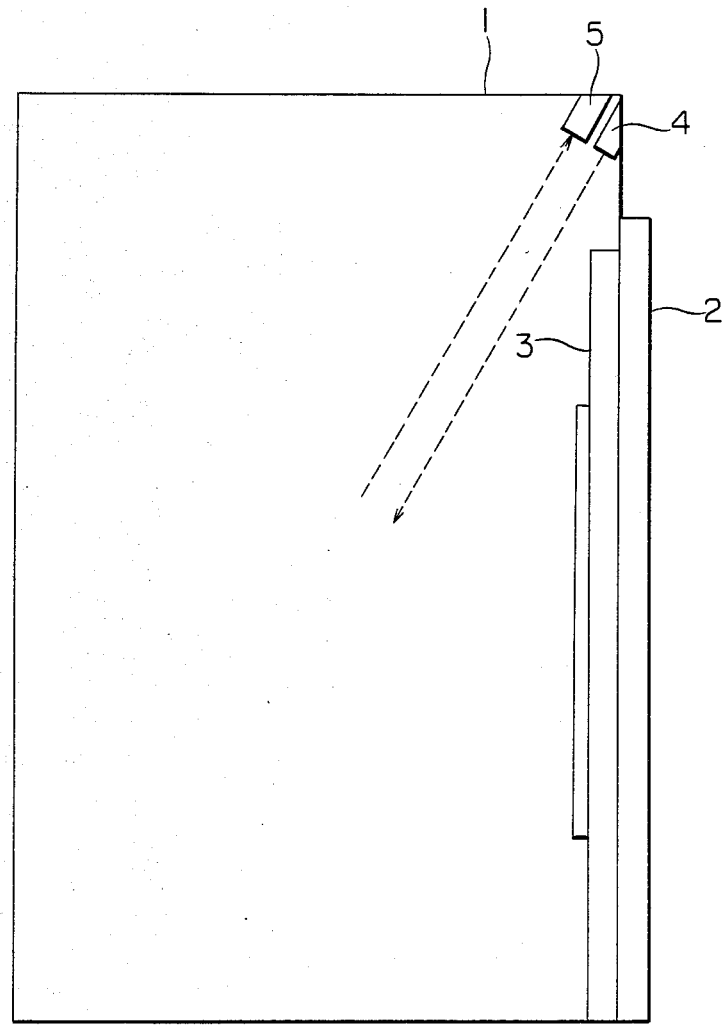
FIGS. 1 and 2 are a plan view and a block diagram showing an embodiment of this invention, respectively.

FIG. 1 is a view showing the state of a cage. Numeral 1 designates the cage, numeral 2 the door of the cage, numeral 3 a cage control panel, numeral 4 a transmitter which transmits an ultrasonic wave inwardly of the cage, and numeral 5 a receiver which receives the ultrasonic wave reflected by an object or a man within the cage. The transmitter 4 and the receiver 5 are mounted near the ceiling of the cage.

Figure 2:
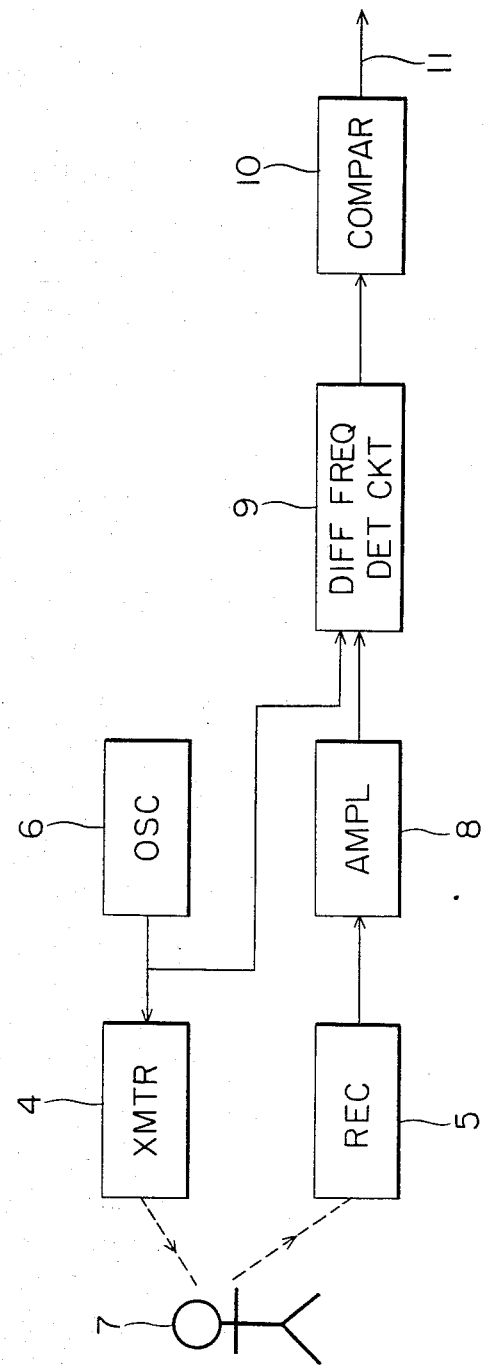

FIG. 2 is a diagram illustrative of the principle of this invention. Numeral 6 indicates an oscillator, numeral 7 a man who has gotten into the cage, numeral 8 an amplifier, numeral 9 a difference frequency detector circuit which detects the frequency of the difference between the outputs of both the oscillator 6 and the amplifier 8, and numeral 10 a comparator which generates an abnormality signal 11 when the output of the difference frequency detector circuit has become greater than or equal to a preset frequency.

In the apparatus thus constructed, when the ultrasonic wave is transmitted from the transmitter 4 on the basis of the output of the oscillator 6, it either impinges on the man 7 within the cage 1 or reflects of the wall of the cage. The ultrasonic wave reflected of the man 7 arrives partly at the receiver 5 directly or while being reflected by the wall of the cage 1 as described to the above. The output of the receiver 5 is amplified by the amplifier 8, and the frequency difference between the output of the oscillator 6 and that of the amplifier 8 is detected by the difference frequency detector circuit 9. When no one is present within the cage, or when the man 7 is present while not moving, the difference frequency becomes zero. In contrast, when the man 7 is moving within the cage, the frequency of the ultrasonic wave reaching the receiver 5 is changed due to the Doppler effect, and the difference in frequency at the output of the difference frequency detector circuit 9 is directly proportional to the rate at which the man 7 moves. The comparator 10 provides an abnormality signal 11 on the basis of the difference frequency when the movement of the man 7 within the cage has become at least a preset rate i.e., the present difference frequency. Here, an elevator control circuit, not shown, is enabled to sound a buzzer in the cage in response to the abnormality signal 11, thereby warning to the man 7 within the cage; to execute the operation of opening the door during the stoppage of the cage; or to stop the cage at the nearest floor and then execute the door opening operation during the running of the cage.

Figure 3:
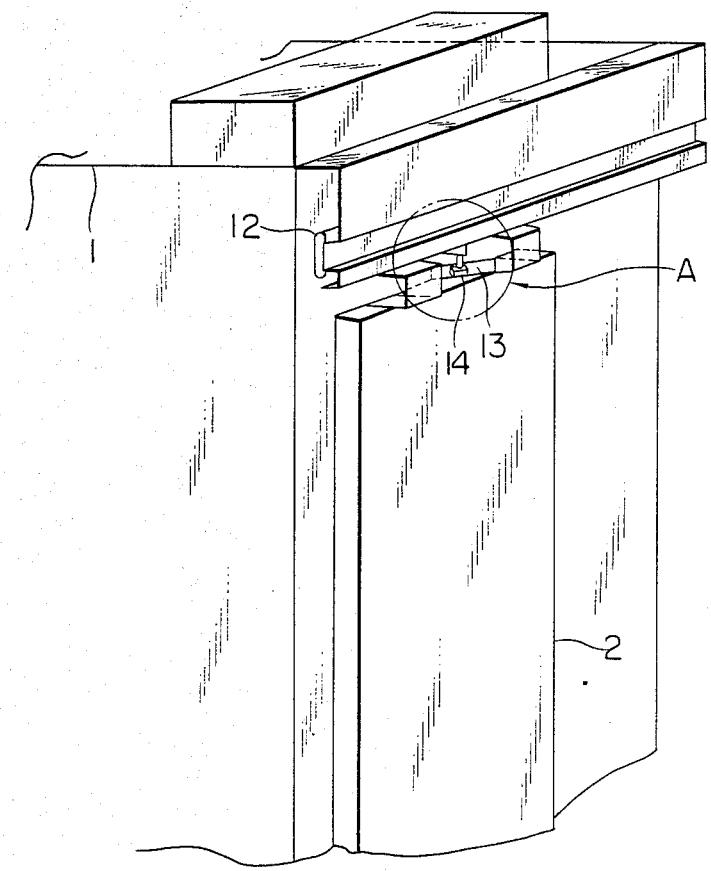
FIG. 3 is a perspective view showing another embodiment of this invention.
Figure 4:
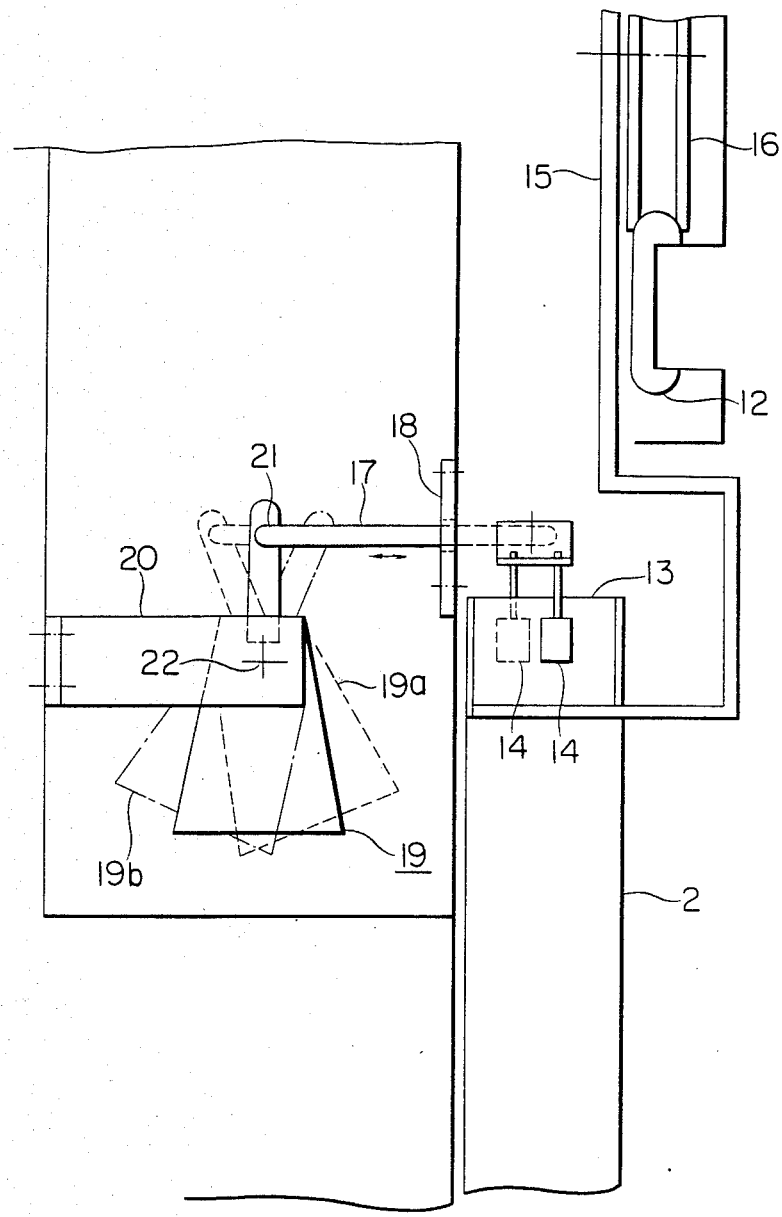
FIG. 4 is a side view showing a part A in FIG. 3.
Figure 5:
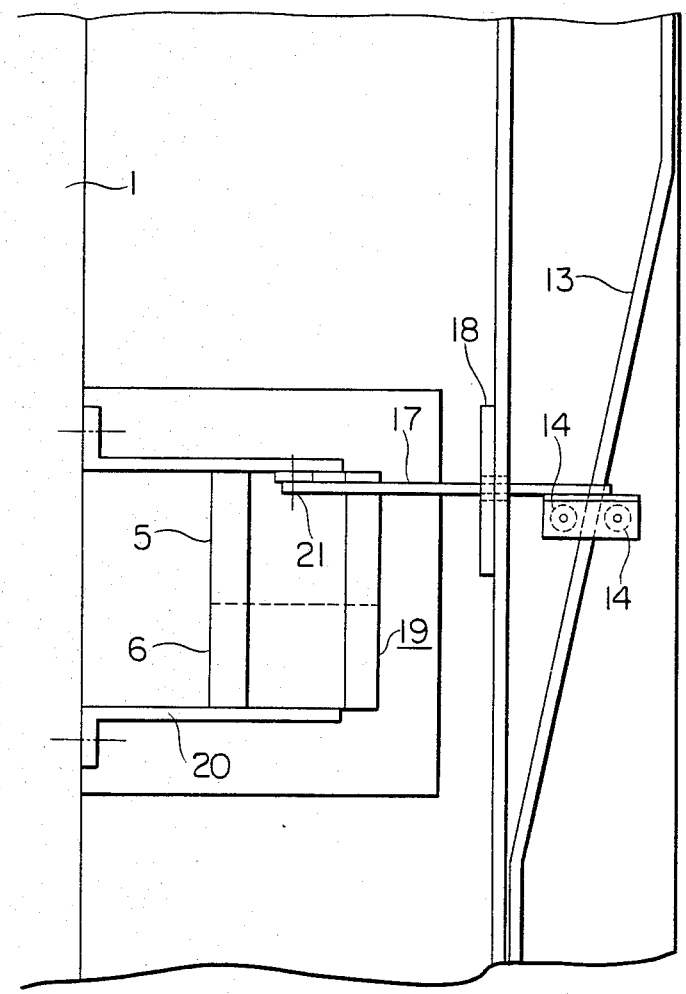
FIG. 5 is a top view corresponding to FIG. 4.

FIGS. 3 to 5 show another embodiment of this invention, in which the same symbols as in FIGS. 1 and 2 indicate identical or corresponding portions. FIG. 3 is a view showing the state of the upper part of the doorway of the cage 1 of the elevator. Numeral 12 indicates a rail for the cage door, numeral 13 a guide rail which is disposed in the upper part of the cage door 2, and numeral 14 a roller which moves along the guide rail 13. FIG. 4 is a view showing the details of a part A in FIG. 3. It is a sectional view seen in the direction of the opening and closing of the door of the cage, and illustrates the state in which the cage door is midway of the opening or closure thereof. Numeral 15 designates a hanger which suspends the door 2, numeral 16 a changer roller which is mounted on the hanger 15 by a pivot not shown and which rolls on the rail 12, numeral 17 an arm which moves in interlocking relationship with the rollers 14, numeral 18 a guide for the arm 17, and numeral 19 a transmission and reception unit in which the transmitter 4 and the receiver 5 are assembled. Symbol 19a denotes the state of the transmission and reception unit under the fully open condition of the cage door 2, and symbol 19b the state of the transmission and reception unit under the fully closed condition of the cage door.

Numeral 20 represents an anchor plate for the transmission and reception unit, and numerals 21 and 22 represent shafts respectively, which are constructed so as to permit the transmission and reception unit 19 to rotate relative to the transmission and reception unit anchor plate 20 and to permit the transmission and reception unit 19 and the arm 17 to rotate. Here, when the door 2 of the cage has shifted into the fully closed condition, the rollers 14 operate relative to the guide rail 13 in the upper part of the cage door 2, and the arm 17 moves in the lengthwise direction thereof. Owing to the linkage constructed of the shafts 21 and 22, the transmission and reception unit 19 is brought into the state 19b and is directed inwardly of the cage room, so that any abnormality in the cage can be detected in accordance with this invention. Conversely, when the cage door has shifted into the fully open condition, the rollers 14 operate relative to the guide rail 13 in the upper part of the cage door 2, and the arm 17 moves to bring the transmission and reception unit 19 into the state 19a. Then, the transmission and reception unit 19 is directed towards the hall of the elevator, and the apparatus is applicable to the detection of a man who comes close to the cage from the hall or is present in the hall, owing to a circuit arrangement similar to the foregoing one.

Figure 7:
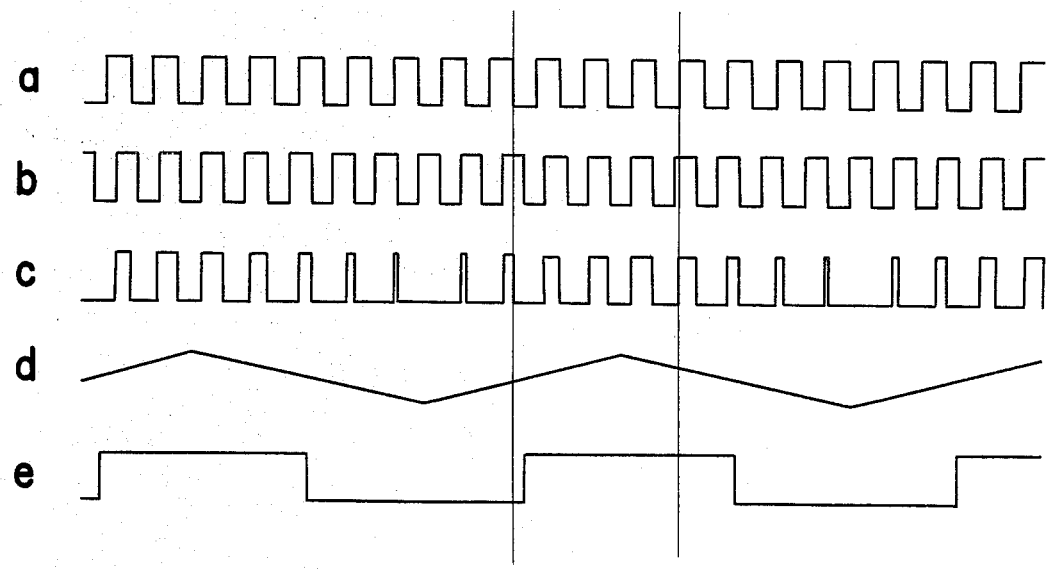
FIGS. 7 and 8 show the output signals of various parts in the difference frequency detector circuit for the cases where a man comes close to a transmitter as well as a receiver and goes away therefrom, respectively.
Figure 8:
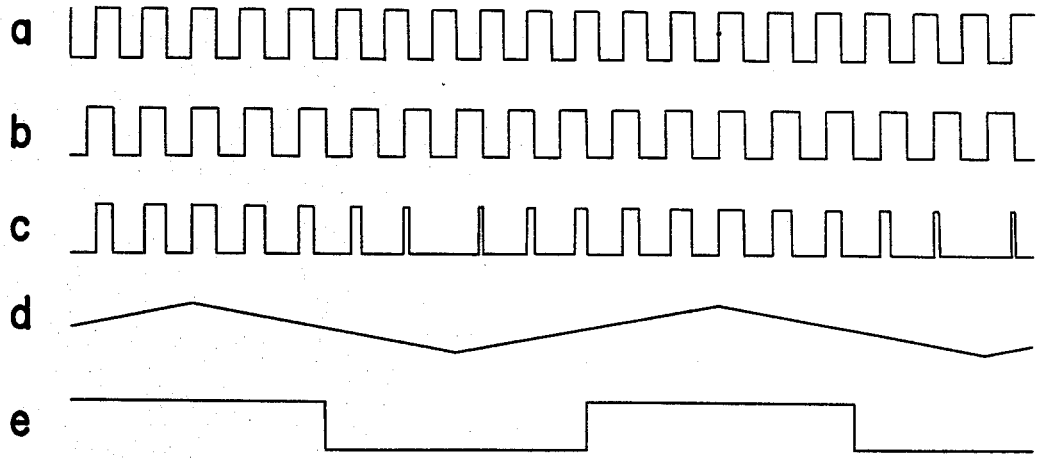

Next, the details of the difference frequency detector circuit 9 and the comparator 10 shown in FIG. 2 will be described with reference to FIGS. 6 to 8.

Figure 6:
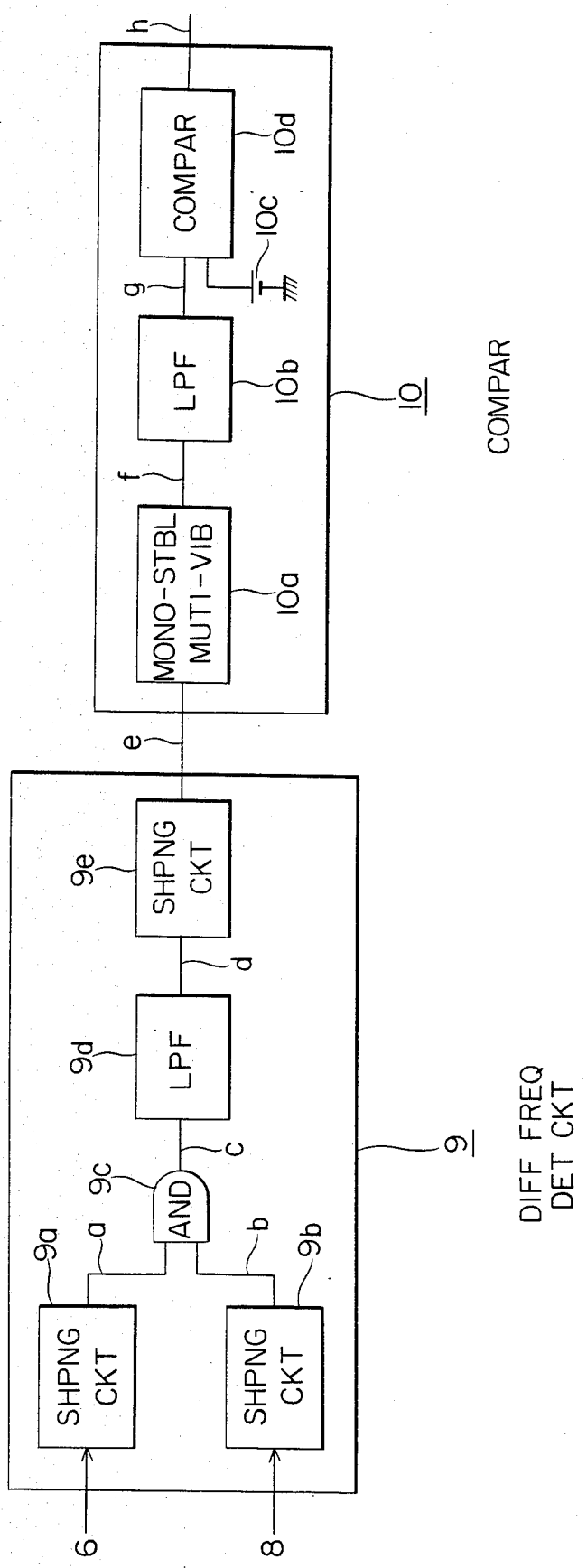
FIG. 6 is a circuit diagram showing the internal arrangements of a difference frequency detector circuit and a comparator shown in FIG. 2.

In FIG. 6, symbols 9a and 9b denote shaping circuits, which shape the outputs of the oscillator 6 and the amplifier 8 into rectangular waves a and b. An AND gate 9c takes the logical product between the outputs of the shaping circuits 9a and 9b. A low-pass filter (LPF) 9d deletes only a low frequency component in the output signal c of the AND gate 9c. A shaping circuit 9e shapes the output signal d of the LPF 9d into a rectangular wave. A monostable multivibrator 10a is activated by the output e of the difference frequency detector circuit 9. A low-pass filter (LPF) 10b deletes a low frequency component in the output signal f of the monostable multivibrator 10a. Shown at symbol 10c is a reference voltage with which a comparator 10d compares the output g of the LPF 10b. FIG. 7 is a diagram showing the voltage waveforms at various stages in the case where the frequency of the amplifier 8 is higher than that of the oscillator 6, for example, the case where the man 7 comes closer to the transmitter 4 as well as the receiver 5. a to e in the figure correspond to the respective output signals mentioned above. Similarly, FIG. 8 shows the signals appearing at various points in the case where the frequency of the amplifier 8 is lower than that of the oscillator 6, for example, the case where the man 7 comes away from the transmitter 4 as well as the receiver 5.

Figure 9:
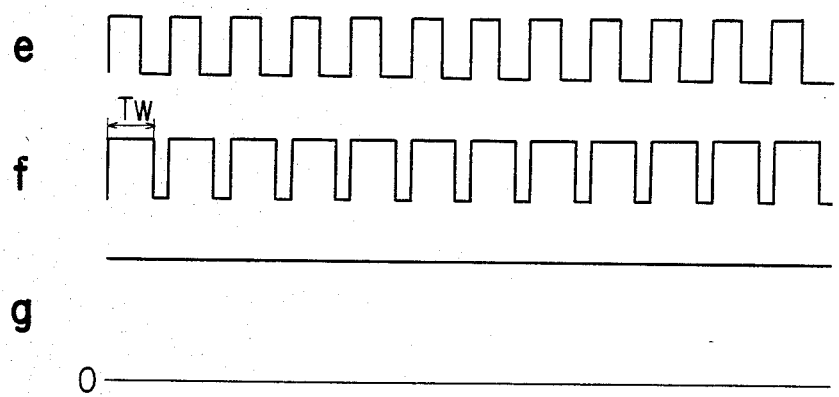
FIGS. 9, 10 and 11 show the output signals at several points of the comparator in the cases where the frequency of the output of the difference frequency detector circuit is high, is low and is still lower, respectively.
Figure 10:
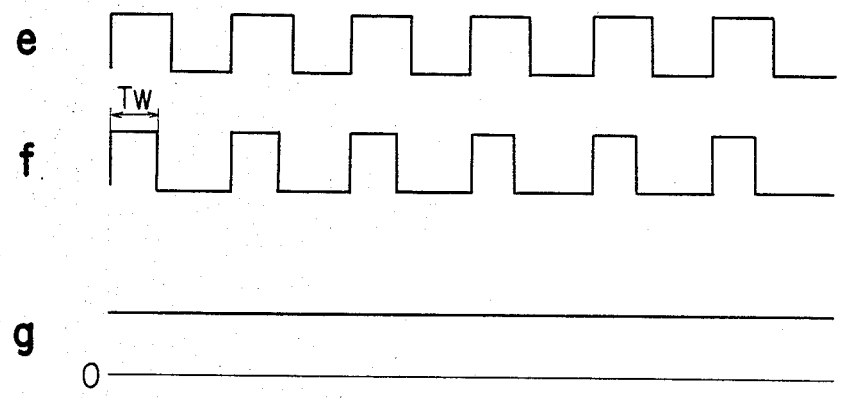
Figure 11:
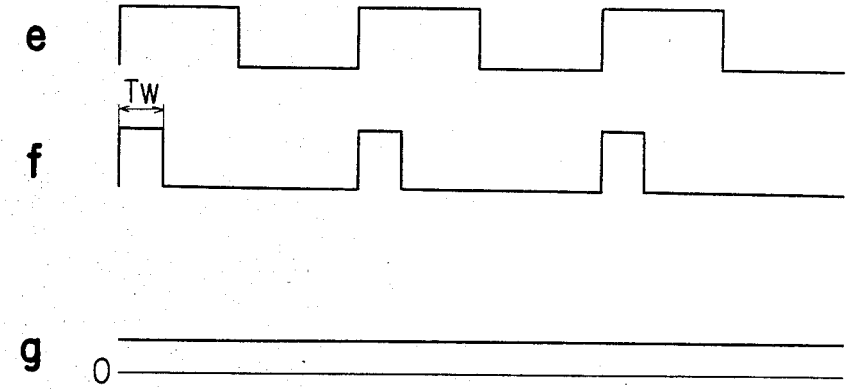

The operation of the comparator 10 in FIG. 6 will now be described with reference to FIGS. 9 to 11. Each time the output e of the difference frequency detector circuit 9 rises, the monostable multivibrator 10a operates to generate a pulse having a time width Tw. When the output signal f of the monostable multivibrator 10a has only the low frequency component deleted therefrom by the LPF 10b, a D.C. output is obtained as the output signal g thereof. FIG. 9 illustrates a case where the frequency of the output e of the difference frequency detector circuit 9 is high, FIG. 10 a case where the difference frequency is ½ of that in FIG. 9, and FIG. 11 a case where the difference frequency is ¼ of that in FIG. 9. Owing to the combination of the monostable multivibrator 10a and the LPF 10b, the frequency can be readily converted into a D-C voltage. The comparator 10d compares the output g of the LPF 10b with the reference voltage 10c, and provides an output h when the difference frequency has become at least a frequency previously determined by the reference voltage 10c.

What is claimed is:

1. An apparatus for detecting any abnormality in a cage of an elevator, comprising a transmitter which continuously transmits an ultrasonic wave inwardly of the cage of the elevator, a receiver which receives an ultrasonic wave retrogressing in such a manner that the ultrasonic wave transmitted from said transmitter is reflected by an object within the cage, and a processing circuit which detects a speed of movement of the object within the cage on the basis of a magnitude of a difference between frequencies of the ultrasonic waves of said transmitter and said receiver and which decides that an abnormal condition exist within the cage when the difference frequency has become at least a preset value.

2. An apparatus for detecting any abnormality in a cage of an elevator as defined in claim 1, wherein said processing circuit comprises a difference frequency detector circuit which is supplied with the frequency of the ultrasonic wave transmitted by said transmitter and the frequency of the ultrasonic wave received by said receiver and which detects the difference between both these frequencies, and a comparator which generates an abnormality signal when an output of said detector circuit has become at least the preset frequency.

3. An apparatus for detecting any abnormality in a cage of an elevator as defined in claim 2, wherein said transmitter is operated by an output of an oscillator, and said difference frequency detector circuit is supplied with the output of said oscillator as the frequency of the ultrasonic wave transmitted by said transmitter.

4. An apparatus for detecting any abnormality in a cage of an elevator as defined in claim 1, wherein said processing circuit provides, upon detecting the abnormality in the cage, a signal for activating an alarm unit disposed in the cage, for opening a door of the cage when the cage is in a stopped mode of operation, or for stopping the cage at a nearest floor and then opening the door when the cage is in a running mode of operation.

5. An apparatus for detecting any abnormality in a cage of an elevator as defined in claim 1, wherein said transmitter and said receiver are installed near a doorway where a door of the cage is disposed, and when the cage door is opened, said transmitter and said receiver are directed toward a hall of the elevator so as to detect a movement of a man in the hall, while when the cage door is closed, they are directed inwardly of the cage so as to detect a movement of a man within the cage.

6. An apparatus for detecting any abnormality in a cage of a elevator as defined in claim 5, wherein said transmitter and said receiver are directed toward the hall or inwardly of the cage by a transmission mechanism which is operated in combination with the opening or closing of the cage door.

7. An apparatus for detecting any abnormality in a cage of an elevator as defined in claim 6, wherein said transmitter and said receiver are rotatably supported by a wall part which forms an edge of the cage doorway, and are rotated with the operation of said transmission mechanism, thereby to be directed toward the hall or inwardly of the cage.

8. An apparatus for detecting any abnormality in a cage of an elevator as defined in claim 6, wherein said transmitter and said receiver are unitarily assembled as a transmission and reception unit.

9. An apparatus for detecting any abnormality in a cage of an elevator as defined in claim 6, wherein said transmission mechanism comprises a guide member which is fixed along a direction of opening and closing the cage door, and a driven member which is driven in engagement with said guide member and which is coupled to said transmitter and said receiver, said guide member displacing said driven member with the operation of opening or closing the cage door and thus changing the direction of said receiver and said transmitter.

10. An apparatus for detecting any abnormality in a cage of an elevator as defined in claim 9, wherein said guide member is a guide rail which is fixed to the cage door in the direction of opening and closing of said door and which has a step in a part thereof, and said driven member is displaceably fixed to one of the stationary members which constitutes the cage.

* * * * *